United States Patent [19]
Rivera et al.

[11] Patent Number: 6,055,828
[45] Date of Patent: May 2, 2000

[54] TREATMENT METHODS FOR GLASS MEDICAL ADHESIVE APPLICATORS

[75] Inventors: Andrés Rivera; Upvan Narang, both of Raleigh; Ubonwan A. Stewart, Durham, all of N.C.

[73] Assignee: Closure Medical Corporation, Raleigh, N.C.

[21] Appl. No.: 09/000,956

[22] Filed: Dec. 30, 1997

[51] Int. Cl.[7] ............................ C03C 17/00; C03C 25/02; C03C 15/00

[52] U.S. Cl. ............................ 65/30.1; 65/60.1; 65/60.3; 65/60.5; 65/60.51; 65/60.52; 65/60.53; 65/60.7; 65/60.8; 427/287; 427/255; 427/344; 427/532; 424/77; 422/21; 422/22; 422/24; 422/40

[58] Field of Search .................... 65/30.1, 60.1, 65/60.3, 60.5, 60.51, 60.52, 60.53, 60.7, 60.8, 111; 427/452, 579, 569, 578, 532, 165, 167, 255, 287, 344, 272.2; 424/77; 422/21, 22, 24, 40

[56] References Cited

U.S. PATENT DOCUMENTS

| | | |
|---|---|---|
| 2,046,302 | 6/1936 | Bowes . |
| 2,525,725 | 10/1950 | Rodman . |
| 2,947,117 | 8/1960 | Greene et al. . |
| 2,947,615 | 8/1960 | Greene et al. . |
| 3,116,991 | 1/1964 | le Clerc et al. . |
| 3,348,934 | 10/1967 | Hinson et al. . |
| 3,451,796 | 6/1969 | Mochel . |
| 3,523,628 | 8/1970 | Colvin et al. . |
| 3,527,841 | 9/1970 | Wicker, Jr. et al. . |
| 3,722,599 | 3/1973 | Robertson et al. . |
| 3,759,264 | 9/1973 | Coover, Jr. et al. . |
| 3,896,077 | 7/1975 | Leonard et al. . |
| 3,940,362 | 2/1976 | Overhults . |
| 3,995,641 | 12/1976 | Kronenthal et al. . |
| 4,042,442 | 8/1977 | Dombroski et al. . |
| 4,164,402 | 8/1979 | Watanabe . |
| 4,188,444 | 2/1980 | Landau . |
| 4,228,206 | 10/1980 | Fabisak . |
| 4,291,131 | 9/1981 | McIntire et al. . |
| 4,828,880 | 5/1989 | Jenkins et al. . |
| 4,904,293 | 2/1990 | Garnier et al. . |
| 5,165,972 | 11/1992 | Porter . |
| 5,292,354 | 3/1994 | Hecq et al. . |
| 5,328,687 | 7/1994 | Leung et al. . |
| 5,372,997 | 12/1994 | Inoue et al. . |

FOREIGN PATENT DOCUMENTS

| | | |
|---|---|---|
| 0811367 A2 | 3/1997 | European Pat. Off. . |
| 3818739 A2 | 12/1988 | Germany . |
| A-58-073360 | 5/1983 | Japan . |
| A-2-153847 | 6/1990 | Japan . |
| A-3-159935 | 7/1991 | Japan . |
| A-5-330556 | 12/1993 | Japan . |
| WO 96/40797 | 12/1996 | WIPO . |
| WO 97/31598 | 9/1997 | WIPO . |

OTHER PUBLICATIONS

Derwent English language abstract for EP 811367, Dec. 1997.

*Primary Examiner*—Stanley S. Silverman
*Assistant Examiner*—Jacqueline A. Ruller
*Attorney, Agent, or Firm*—Oliff & Berridge, PLC.

[57] ABSTRACT

Treatment methods for glass medical adhesive applicators in which a glass applicator is exposed to ammonium sulfate, an acidic gas, a plasma or a silanizing agent in order to remove or coat alkalide materials trapped in the glass.

37 Claims, 3 Drawing Sheets

Viscosity of 2-Octyl cyanoacrylate After One Week at 50C in 7 mL Glass Bottles

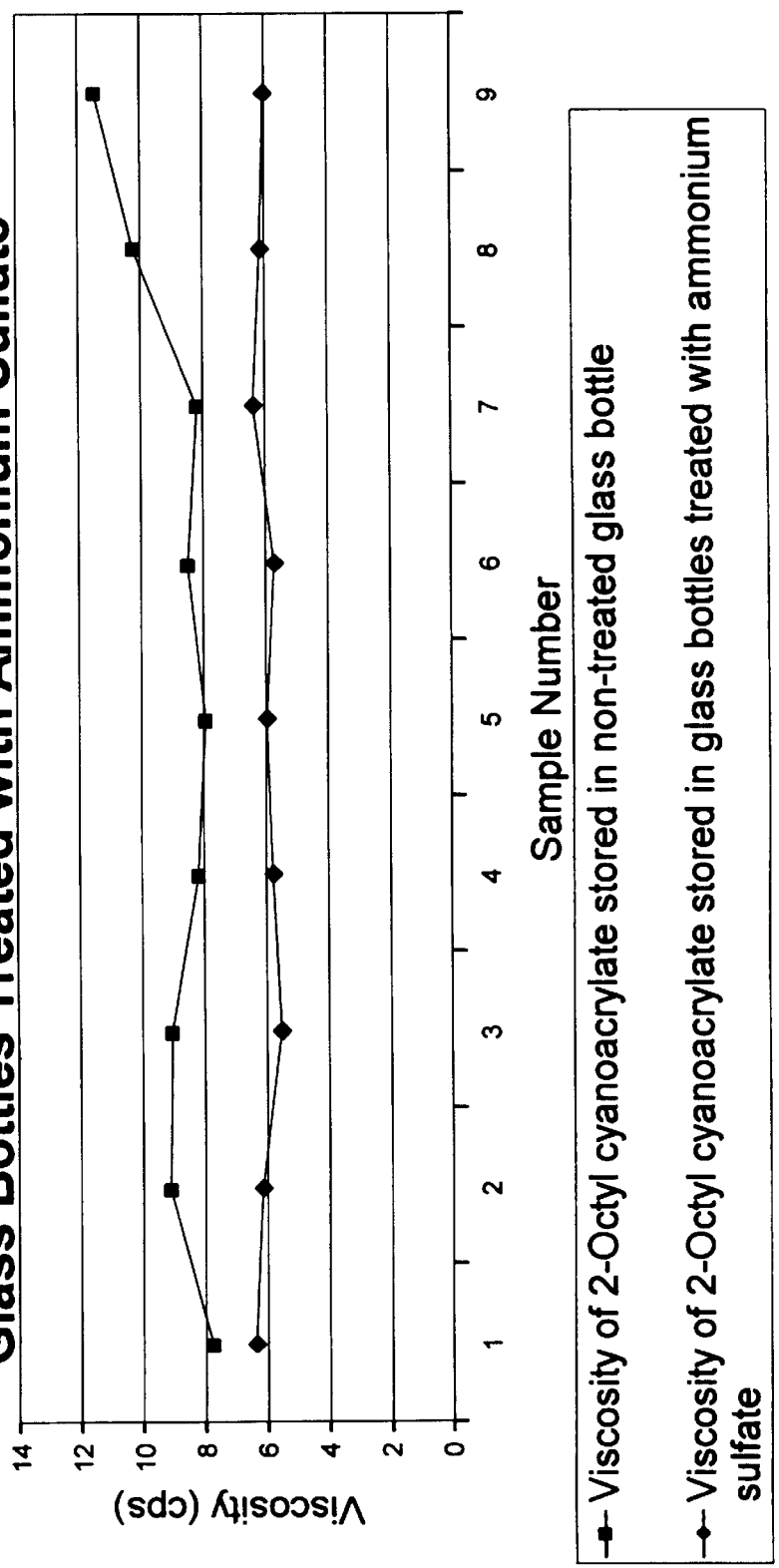

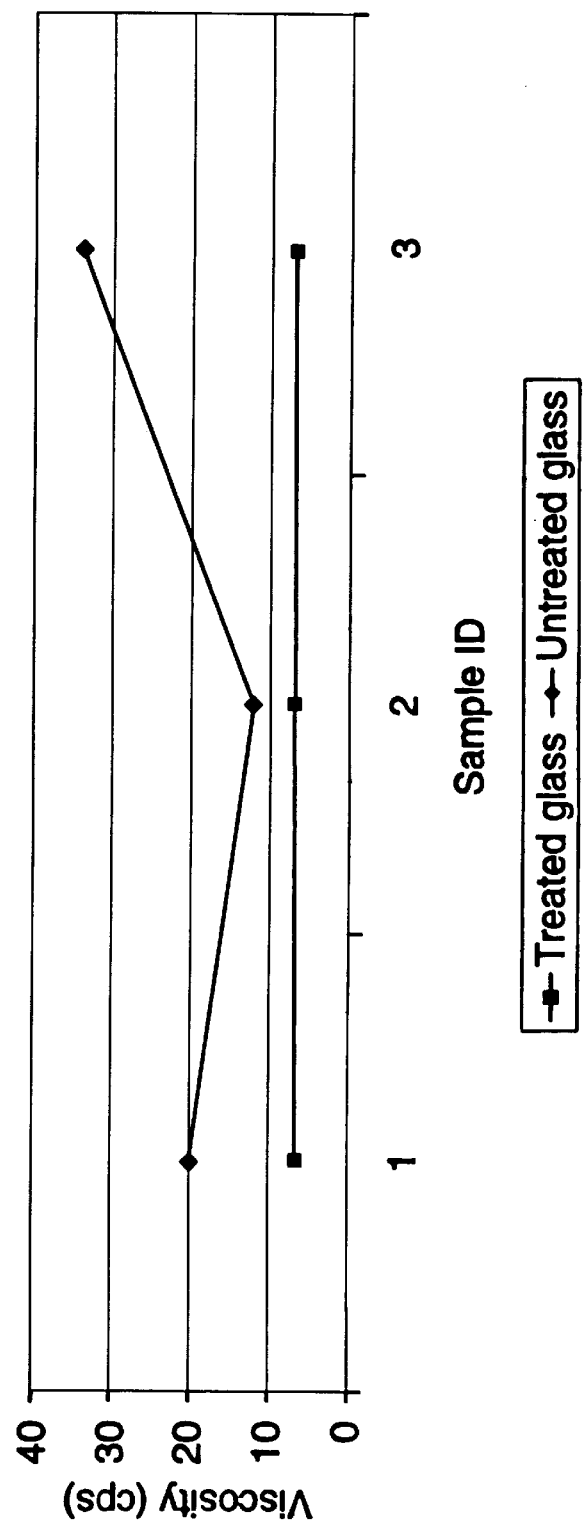

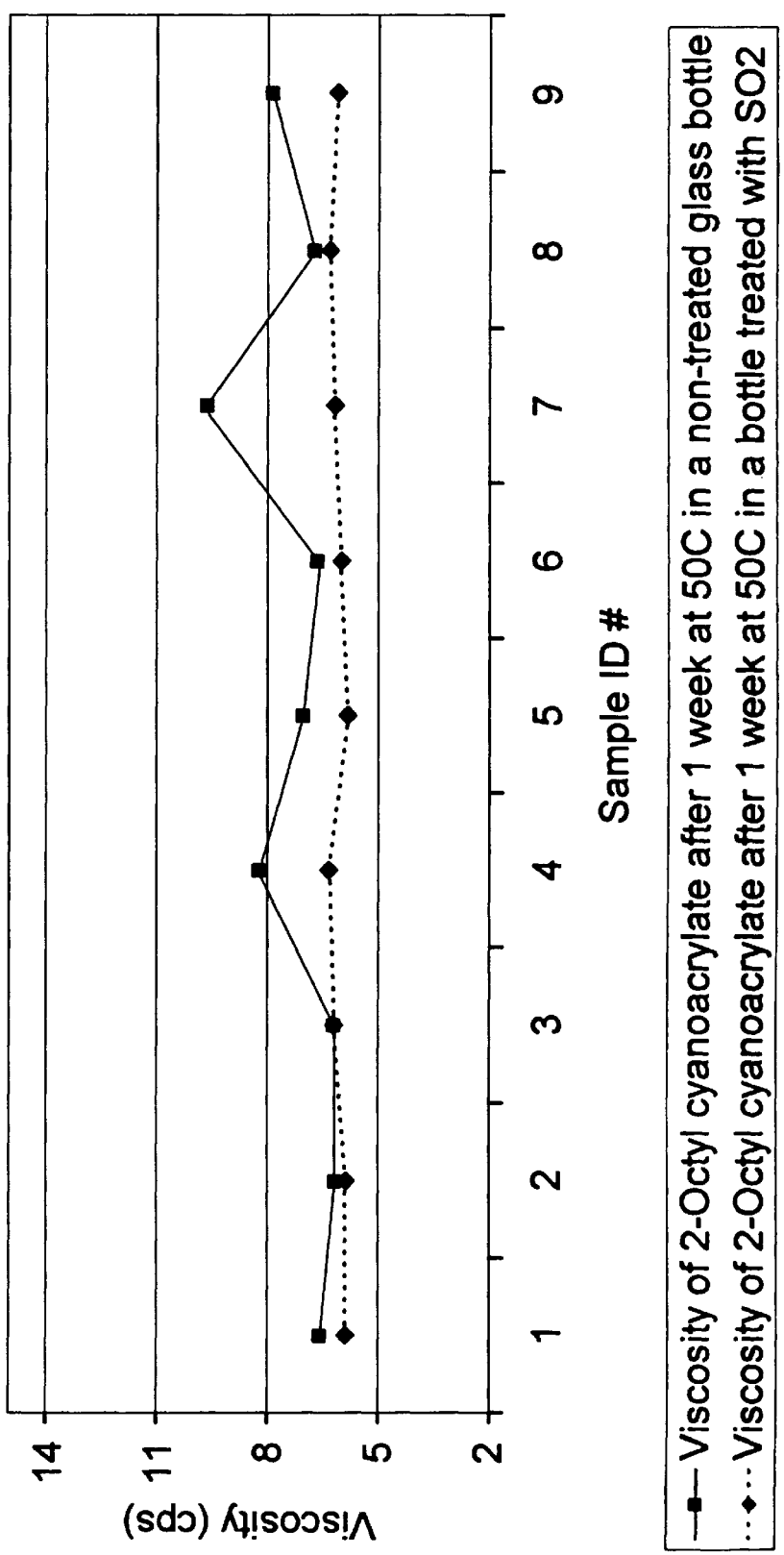

TREATMENT METHODS FOR GLASS MEDICAL ADHESIVE APPLICATORS

BACKGROUND OF THE INVENTION

1. Field of the Invention

The present invention is directed to medical adhesive applicators in which an adhesive is stored in a glass container. More specifically, the present invention is directed to glass treatment methods comprising exposing a glass applicator or container to ammonium sulfate, an acidic gas, a plasma containing silicon dioxide or a silanizing agent in order to remove alkalide materials trapped in the glass or to coat the glass so that the alkalide materials will not contact any adhesive placed in the glass applicator.

2. Description of Related Art

Processes for treating medicament glass containers to decrease the alkalinity of the glass are known.

For example, U.S. Pat. No. 2,046,302 to Bowes discloses a method of neutralizing the alkalinity of the interior surface of hollow ceramic articles by depositing in the article, while it is hot, a pellet of sulfur dioxide, which when subjected to heat of the article, fires and creates an acidic gas. U.S. Pat. No. 2,525,725 to Rodman discloses a method for treating the interior surfaces of open mouth bottles by heating the bottles to a high temperature in the presence of sulfur dioxide.

U.S. Pat. Nos. 2,947,117 and 2,947,615 both issued to Greene et al., disclose a method of reducing the alkalinity of internal surfaces of small mouthed bottles or ampules containing aqueous solutions for medical use by heating the bottles and/or ampules in the presence of an acidic gas. The process is conducted to eliminate or reduce a decrease in potency or an increase in toxicity of the medicaments due to leaching of alkali.

U.S. Pat. No. 3,116,991 to le Clerc discloses a process of dealkalizing glass by heating the glass at elevated temperatures in the presence of ammonium acid sulfate. U.S. Pat. No. 3,348,934 to Hinson et al. discloses the treatment of surfaces of glass containers to reduce surface alkalinity by converting sulfur trioxide to sulfur dioxide by contacting gaseous sulfur trioxide with the glass surface at an elevated temperature followed by washing with water to remove the alkali. U.S. Pat. No. 3,451,796 to Mochel discloses exposing glass to a sulfur oxide atmosphere at a temperature below the strain point of glass to dealkalize the glass surface to increase the acid durability of the glass.

U.S. Pat. No. 4,228,206 to Fabisak discloses a method for reducing the alkali content of the inner surface of glass tubing by introducing an acidic gas (e.g., sulfur dioxide, hydrogen chloride or nitric acid) into the glass tubing at a hot draw stage during formation of the tubing to react with the alkali ions on the inner surface of the glass. U.S. Pat. No. 4,904,293 to Gamier et al. discloses dealkalizing of glass microspheres. U.S. Pat. No. 5,292,354 to Hecq et al. discloses a method of producing dealkalized sheet glass in which the glass sheet is subjected to at least one acid gas in multiple stages at different elevated temperatures. The entire disclosures of all of the foregoing references are hereby incorporated by reference herein.

However, there continues to be a need to eliminate alkalide materials that may come in contact with medical adhesives in glass applicators.

One group of such adhesives is the monomeric forms of alpha-cyanoacrylates. Reference is made, for example, to U.S. Pat. Nos. 3,527,841 (Wicker et al.); 3,722,599 (Robertson et al.); 3,995,641 (Kronenthal et al.); and 3,940,362 (Overhults), which disclose that alpha-cyanoacrylates are useful as surgical adhesives. The entire disclosures of all of the foregoing references are hereby incorporated by reference herein.

Typically, when used as adhesives and sealants, cyanoacrylates are applied in monomeric form to the surfaces to be joined or sealed, where, typically, in situ anionic polymerization of the monomer occurs, giving rise to the desired adhesive bond or seal. Implants, such as rods, meshes, screws, and plates, may also be formed of cyanoacrylate polymers, formed typically by radical or anionic-initiated polymerization.

However, a drawback to the in vivo biomedical use of alpha-cyanoacrylate monomers and polymers has been their potential for causing adverse tissue response. For example, methyl alpha-cyanoacrylate has been reported to cause tissue inflammation at the site of application. The adverse tissue response to alpha-cyanoacrylates appears to be caused by the products released during in vivo biodegradation of the polymerized alpha-cyanoacrylates. It is believed that formaldehyde is the biodegradation product most responsible for the adverse tissue response and, specifically, the high concentration of formaldehyde produced during rapid polymer biodegradation.

In U.S. Pat. No. 5,328,687, the entire contents of which are hereby incorporated by reference, the use of formaldehyde scavengers has been proposed to improve biocompatibility of alpha-cyanoacrylate polymers, whose biodegradation produces formaldehyde, for use in in vivo applications. In addition, U.S. patent application Ser. No. 08/714,288, filed Sep. 18, 1996, the entire disclosure of which is incorporated herein by reference, discloses a biocompatible pH modifier effective to regulate the pH of an immediate environment of the in situ cyanoacrylate polymer.

Various compounds can affect polymerization of alpha-cyanoacrylate monomers. Acids inhibit or slow polymerization (e.g., Leonard et al., U.S. Pat. No. 3,896,077), and bases accelerate polymerization (e.g., Coover et al., U.S. Pat. No. 3,759,264 and Dombroski et al., U.S. Pat. No. 4,042,442). For example, U.S. Pat. No. 3,759,264 to Coover et al., the entire disclosure of which is incorporated herein by reference, discloses that 2-cyanoacylate adhesive compositions rapidly polymerize in the presence of weakly basic catalysts such as water, alcohols and amines. Similarly, U.S. Pat. No. 3,759,264 to Coover et al., the entire disclosure of which is incorporated herein by reference, discloses that a basic material such as amines and alcohols can be added to accelerate the polymerization of monomeric esters of α-cyanoacrylic acid.

Because alkalide materials negatively affect the shelf life of monomeric adhesives by initiating premature polymerization as indicated, for example, by an increased viscosity, there is a need to eliminate alkalide materials that come in contact with medical adhesives in glass applicators.

SUMMARY OF THE INVENTION

The present invention is directed to methods for treating a glass medical adhesive applicator, or similar glass packages, ampules or products, in order to remove alkalide materials trapped in the glass or to coat the glass so that the alkalide materials will not contact any adhesive (or other material) placed in the applicator. As a result of the present invention, the initiation of premature polymerization of monomeric adhesive compositions is inhibited.

In embodiments, a glass product such as a glass medical adhesive applicator is exposed to ammonium sulfate, an acidic gas, a plasma or a silanizing agent. The alkalide materials trapped within the glass react with the ammonium sulfate or acidic gas to form an alkalide salt that is then rinsed from the glass. If a glass applicator is treated with a plasma containing silicon dioxide, a thin film of silicon dioxide bonds to the surface of the glass, thereby coating the glass surface and protecting any adhesive placed in the applicator from alkalide materials. Similarly, treatment of the surface of a glass applicator with a silanizing agent, followed by curing, coats the glass container and protects any adhesive placed therein.

BRIEF DESCRIPTION OF DRAWINGS

FIG. 1 shows the effect of a glass container treated with ammonium sulfate on the viscosity of a monomeric adhesive composition.

FIG. 2 shows the effect of a glass container treated with silicon dioxide on the viscosity of a monomeric adhesive composition.

FIG. 3 shows the effect of a glass container treated with sulfur dioxide on the viscosity of a monomeric adhesive composition.

DETAILED DESCRIPTION OF PREFERRED EMBODIMENTS

The present invention is directed to methods of treating glass medical adhesive applicators or similar glass containers, comprising treating a glass applicator with at least one of ammonium sulfate, an acidic gas, a plasma, or a silanizing agent.

According to a first embodiment of the present invention, ammonium sulfate $((NH)_4SO_4H)$ is placed into a glass applicator or container. The glass applicator is then heated to the annealing temperature of the glass. The annealing temperature will vary depending on the glass used. In embodiments, the glass container is heated to a temperature of about 450–800° C. at any effective heating rate, for example, 25° C./min. Once the temperature of the glass container reaches the annealing temperature, it is slowly cooled to room temperature. The cooling rate may be any effective rate. For example, in embodiments, the cooling rate is about 25° C./min. The alkalide materials in the glass form alkalide sulfates as they migrate to the surface of the glass container and are rinsed away, preferably with distilled water. An aqueous extract of the glass container has a pH value of about 5, which is lower than the pH of an aqueous extract of an untreated glass container (i.e., about 7). The low pH value and the lack of alkaline moieties significantly extends the shelf life of any adhesive placed into the glass container.

According to a second embodiment of the present invention, a glass container or applicator is placed in a chamber. In embodiments, the chamber is heat and rust resistant. An acidic gas including, but not limited to, sulfur dioxide $(SO_2)$, carbon dioxide $(CO_2)$, nitrous oxide (NO), nitrogen dioxide $(NO_2)$; boron trifluoride $(BF_3)$ and the like is introduced into the chamber. In embodiments, the acidic gas is introduced into the chamber for about 5–10 minutes to yield a concentration of about 10% acidic gas in air. The chamber is then heated to a temperature of about 150–500° C. for a period of about 3–5 hours. Exposure time of the glass container to the acidic gas is proportional to temperature (i.e., a shorter exposure time is required when a higher heating temperature is used). The chamber is then allowed to cool to room temperature. The alkalide materials in the surface of the glass are removed by washing, preferably with distilled water, thereby creating a layer that is free from alkalide materials. If the alkalide materials in the entire glass applicator are to be removed, the chamber may be heated at a rate of about 25° C./min to the annealing temperature of the glass, for example between about 450–800° C. Accordingly, the alkalide materials will migrate to the surface of the glass where they form alkalide salts, and can be washed away, an aqueous extract from said washing away having a pH of about 5.

Preferably, in the above embodiments, the rinsing is conducted once the treated glass applicator has returned to about room temperature. However, the rinsing step may be conducted one or more times during the cooling process, as necessary.

According to a third embodiment of the present invention, a glass applicator is placed into a plasma chamber. Silicon dioxide $(SiO_2)$ is added to the plasma in gaseous form. A thin film of the silicon dioxide bonds to the surface of the glass applicator, thereby coating the surface of the glass applicator. Thus, any adhesive placed into the glass applicator will be protected from the alkalide materials.

In the above embodiments, the alkalide materials on the surface of the glass container preferably decrease from about 1.1 wt. % to about 0 wt. %.

According to a fourth embodiment of the present invention, a glass applicator or container is rinsed with a solution (1) obtained by dissolving a radical inhibitor in a solvent containing a silanizing agent, or (2) containing a silanizing agent derivative that acts as a radical inhibitor. The radical inhibitor includes, but is not limited to, hydroquinone or para-methoxyphenol, butylated hydroxyanisole, and the like. The solvent can be any effective solvent including, but not limited to, water, methanol and ethanol. The silanizing agent is any effective silane compound. In embodiments, the silanizing agent includes, but is not limited to, tetramethoxysilane, tetraethoxysilane, tetraisobutoxysilane, and the like. A catalyst may also be added to the above-identified solution, such as hydrochloric acid. In embodiments, a molar ratio of silanizing agent : water: solvent : catalyst is about $1:2:4:1.2\times10^{-5}$. The silanized glass is cured at a temperature of at least 100° C. above the boiling point of the selected solvent.

The resulting coated glass container prevents radical polymerization of a monomeric adhesive placed into the glass container or applicator. This aspect of the present invention is particularly useful when the monomeric adhesive is to be exposed to radiation. In embodiments, the radiation includes, but is not limited to, gamma irradiation, electron beam irradiation and visible light irradiation including ultraviolet irradiation and infrared irradiation.

The present invention is not limited to the time, temperature, concentrations, molar ratios or other process conditions illustrated above. Rather, the descriptions given above are exemplary only, and can be modified as desired so long as the objectives of the present invention are maintained.

The monomers used in the adhesives according to the present invention are polymerizable, e.g., anionically polymerizable or free radical polymerizable, to form polymers that may or may not biodegrade. In some embodiments, the polymers form active formaldehyde upon biodegradation.

Monomer compositions of this invention may be applied to a surface to be sealed or joined together with a second surface in vivo, where, typically, in situ anionic polymerization of the monomer occurs, giving rise to the desired adhesive bond or seal.

Useful 1,1-disubstituted ethylene monomers include, but are not limited to, monomers of the formula:

$$CHR=CXY \quad (1)$$

wherein X and Y are each strong electron withdrawing groups, and R is H, —CH=CH$_2$ or, provided that X and Y are both cyano groups, a C$_1$–C$_4$ alkyl group.

Examples of monomers within the scope of formula (I) include alpha-cyanoacrylates, vinylidene cyanides, C$_1$–C$_4$ alkyl homologues of vinylidene cyanides, dialkyl 2-methylene malonates, acylacrylonitriles, vinyl sulfinates and vinyl sulfonates of the formula CH$_2$=CX'Y' wherein X' is —SO$_2$R' or —SO$_3$R' and Y' is —CN, —COOR', —COCH$_3$, —SO$_2$R' or —SO$_3$R', and R' is H or hydrocarbyl.

Preferred monomers of formula (I) for use in this invention are alpha-cyanoacrylates. These monomers are known in the art and have the formula

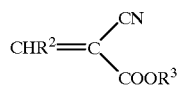
(II)

wherein R$^2$ is hydrogen and R$^3$ is a hydrocarbyl or substituted hydrocarbyl group; a group having the formula —R$^4$—O—R$^5$—O—R$^6$, wherein R$^4$ is a 1,2-alkylene group having 2–4 carbon atoms, R$^5$ is an alkylene group having 2–4 carbon atoms, and R$^6$ is an alkyl group having 1–6 carbon atoms; or

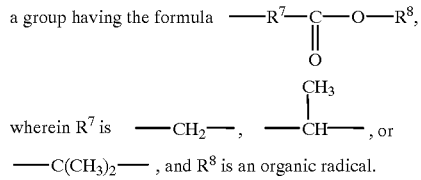

Examples of suitable hydrocarbyl and substituted hydrocarbyl groups include straight chain or branched chain alkyl groups having 1–16 carbon atoms; straight chain or branched chain C$_1$–C$_{16}$ alkyl groups substituted with an acyloxy group, a haloalkyl group, an alkoxy group, a halogen atom, a cyano group, or a haloalkyl group; straight chain or branched chain alkenyl groups having 2 to 16 carbon atoms; straight chain or branched chain alkynyl groups having 2 to 12 carbon atoms; cycloalkyl groups; aralkyl groups; alkylaryl groups; and aryl groups.

In the cyanoacrylate monomer of formula (II), R$^3$ is preferably an alkyl group having 1–10 carbon atoms or a group having the formula —AOR$^9$, wherein A is a divalent straight or branched chain alkylene or oxyalkylene radical having 2–8 carbon atoms, and R$^9$ is a straight or branched alkyl radical having 1–8 carbon atoms.

Examples of groups represented by the formula —AOR$^9$ include 1-methoxy-2-propyl, 2-butoxyethyl, 2-isopropoxyethyl, 2-methoxyethyl, 2-ethoxyethyl and 3-methoxybutyl.

Especially advantageous alpha-cyanoacrylate monomers for use in this invention are methyl alpha-cyanoacrylate, butyl alpha-cyanoacrylate, 2-octyl alpha-cyanoacrylate, 1-methoxy-2-propyl cyanoacrylate, 2-butoxyethyl cyanoacrylate, 2-isopropoxyethyl cyanoacrylate and 3-methoxybutyl cyanoacrylate. Equally advantageous are 2-methylene malonates, such as dimethyl 2-methylenemalonate.

Examples of monomers of formula (II) include cyanopentadienoates and alpha-cyanoacrylates of the formula:

(III)

wherein Z is —CH=CH$_2$ and R$^3$ is as defined above. The monomers of formula (III) wherein R$^3$ is an alkyl group of 1–10 carbon atoms, i.e., the 2-cyanopenta-2,4-dienoic acid esters, can be prepared by reacting an appropriate 2-cyanoacetate with acrolein in the presence of a catalyst such as zinc chloride. This method of preparing 2-cyanopenta-2,4-dienoic acid esters is disclosed, for example, in U.S. Pat. No. 3,554,990, which is incorporated by reference herein.

A pH modifier may optionally be selected to modify, in vivo, a pH of an immediate in vivo environment of the adhesive polymer to a pH level at which in vivo biodegradation of the in situ polymer proceeds more quickly than it does at a physiologic pH. Basic pH modifiers allow the use of polymer materials otherwise degrading slowly or not at all in vivo, e.g., butyl alpha-cyanoacrylate or 2-octyl alpha-cyanoacrylate. The pH modifier is added in an amount sufficient to accelerate the polymer's biodegradation, but the accelerated release of biodegradation products (e.g., formaldehyde) must remain within physiologically tolerable ranges. In this aspect, a formaldehyde scavenger may also be added to keep formaldehyde levels within tolerable levels, for instance, in the manner of related application, U.S. application No. 08/040,618, now U.S. Pat. No. 5,328,687, the entire disclosure of which is incorporated herein by reference.

For purposes of this invention, the microencapsulated form of a pH modifier is advantageous because this embodiment prevents or substantially reduces preapplication effects of the pH modifier, e.g., a basic pH modifier, thereby increasing shelf-life and facilitating handling of the monomer composition during use.

In such embodiments, the pH modifier may include, but is not limited to, an acidic compound or anhydrous precursor thereof or a chemically protected acid. For example, the pH modifier may comprise at least one member selected from the group consisting of: amino acids; carboxylic acids and salts thereof; di-acids and salts thereof; poly-acids and salts thereof; esters that are easily hydrolyzable in vivo; lactones that are easily hydrolyzable in vivo; organic carbonates; enolic compounds; acidic phenols; polyphenolic compounds; aromatic alcohols; ammonium compounds or salts thereof; boron-containg compounds; sulfonic acids and salts thereof; sulfinic acids and salts thereof; phosphorus-containing compounds; acid halides; chlorofornates; acid gases; acid anhydrides; inorganic acids and salts thereof; and polymers having functional groups of at least one of the preceding members. The pH modifier of this invention may, for example, comprise at least one member selected from the group consisting of glycine; alanine; proline; lysine; glutaric acid; D-galacturonic acid; succinic acid; lactic acid; glycolic acid; poly(acrylic acid); sodium acetate; diglycolic anhydride; succinic anhydride; citraconic anhydride; maleic anhydride; lactide; diethyl oxalate; Meldrum's acid; diethyl carbonate; dipropyl carbonate; diethyl pyrocarbonate; diallyl pyrocarbonate; di-tert-butyl dicarbonate; ascorbic acid; catechin; ammonium chloride; D-glucosamine hydrochloride; 4-hydroxyephedrine hydrochloride; boric acid; nitric acid; hydrochloric acid; sulfiric acid; ethanesulfonic acid;

and p-toluenesulfonic acid; 2-aminoethylphosphoric acid; methylphosphonic acid; dimethylphosphinic acid; methyl chloroformate; sulfur dioxide; and carbon dioxide. Glutaric acid and diethyl carbonate are particularly preferred in embodiments of the invention.

The pH modifier may alternatively be selected to modi, in vivo, a pH of an immediate in vivo environment of the polymer to a pH level at which in vivo biodegradation of the in situ polymer proceeds more quickly than it does at a physiologic pH. In such embodiments, the pH modifier may include a basic compound or anhydrous precursor thereof, and/or a chemically protected base. For example, the pH modifier may comprise at least one member selected from the group consisting of hydroxides; alkoxides; basic carbonates; nitrogen-containing compounds; amines; alkaloids; hydrides; organolithium compounds; Grignard reagents; carbanions; and polymers having functional groups of at least one of the preceding members. The pH modifier (whether single or in combination) may be, for example, selected from the group consisting of sodium hydroxide; potassium hydroxide; sodium methoxide; potassium t-butoxide; sodium carbonate; calcium carbonate; dibutylamine; tryptamine; sodium hydride; calcium hydride; butyllithium; and ethylmagnesium bromide.

Examples of coating materials that can be used to microencapsulate the pH modifier include, but are not limited to polyesters, such as polyglycolic acid, polylactic acid, copolymers of polyglycolic acid and polylactic acid, polycaprolactone, poly-b-hydroxybutyrate, copolymers of $\epsilon$-caprolactone and d-valerolactone, copolymers of $\epsilon$-caprolactone and DL-dilactide, and polyester hydrogels; polyvinylpyrrolidone; polyamides; gelatin; albumin; proteins; collagen; poly(orthoesters); poly(anhydrides); poly(alkyl-2-cyanoacrylates); poly(dihydropyrans); poly(acetals); poly(phosphazenes); poly(urethanes); poly(dioxinones); cellulose; and starches.

As noted above, formaldehyde may be released as a byproduct of in situ biodegradation of the biocompatible polymer. A formaldehyde concentration-reducing agent or formaldehyde scavenger, e.g., sodium bisulfite, may be added to the compositions and methods of this invention to control formaldehyde release in situ and to minimize harmful effects therefrom, as disclosed in U.S. Pat. No. 5,328,687, the entire disclosure of which is incorporated herein by reference.

In embodiments, the monomeric adhesive composition may be sterile. Sterilization methods include, but are not limited to, gamma irradiation, electron beam irradiation, microwave iradiation, dry heat, and visible light irradiation such as ultraviolet and infrared irradiation, asceptic filtration, and the like.

The monomeric adhesive composition is placed in a glass applicator, or similar glass container, that has been treated as described above with at least one of ammonium sulfate, an acidic gas, a plasma, or a silanizing agent. In embodiments, the glass applicator also has an applicator tip.

In embodiments, the glass applicator may have a detachable applicator tip. Such an applicator tip could be attached to the applicator container prior to use and detached from the applicator container subsequent to use in order to prevent premature polymerization or cross-linking of the unapplied material in the applicator container. At this point, the applicator tip may be discarded and a new applicator tip may be attached to the applicator container for subsequent use, or the applicator tip may be reused.

Additionally, the applicator tip according to the present invention may comprise multiple parts, with at least one part comprising the initiator. For example, the component comprising the initiator may be fabricated separately from the other component(s) of the applicator tip and assembled prior to attachment to the applicator container.

The applicator tip may also be in the form of a nozzle for atomizing liquid polymerizable and/or cross-linkable materials. Conical, flat spray or condensed stream nozzles are suitable.

The applicator tip according to the present invention may be utilized in various devices. For example, manual methods of application may include utilization of hand-held devices such as syringes, adhesive guns, pipettes, eyedroppers and the like.

The applicator tip and the applicator container may also be an integral unit. The unit may be preformed as a single piece and charged with polymerizable and/or cross-linkable material. After application of material from the applicator container, the unit may be discarded. Additionally, such an integral applicator tip/applicator container unit may be fashioned to provide the capability of recharging the unit with new material as a multiple use device.

The applicator tip may be composed of any of a variety of materials including polymerized materials such as plastics, foams, rubber, thermosets, films or membranes. Additionally, the applicator tip may be composed of materials such as metal, glass, paper, ceramics, and the like. The applicator tip material may be porous, absorbent or adsorbent in nature to enhance and facilitate loading of the initiator on or within the applicator tip. For example, the applicator tip may be composed of a material having random pores, a honey-comb material, a material having a woven pattern, etc. The degree of porosity will depend on the materials being used.

The applicator tip according to the present invention, where it connects to the applicator container, may have an elongated tubular portion, out of which the mixed polymerizing and/or cross-linking material is expelled. A portion of the applicator tip which is immediately downstream of the applicator container is advantageously porous in order to avoid a sharp pressure drop and ensure a constant mixed ratio profile. The structure can preferably trap any barriers or materials used to separate multiple components within the applicator container. Thus, any such barriers will not clog the device.

Initiators that initiate polymerization and/or cross-linking of the material may be applied to a surface portion or to the entire surface of the applicator tip, including the interior and the exterior of the tip. Alternatively, the initiator may be coated only on an internal surface of the applicator tip. Preferably, only a portion of the interior of the applicator tip is coated with the initiator.

The initiator on the applicator tip may be in the form of a solid, such as a powder or a solid film, or in the form of a liquid, such as a viscous or paste-like material. The initiator may also include a variety of additives, such as surfactants or emulsifiers. Preferably, the initiator is soluble in the polymerizable and/or cross-linkable material, and/or comprises or is accompanied by at least one surfactant which, in embodiments, helps the initiator co-elute with the polymerizable and/or cross-linkable material. In embodiments, the surfactant may help solubilize the initiator in the polymerizable and/or cross-linkable material.

Particular initiators for particular systems may be readily selected by one of ordinary skill in the art without undue experimentation. Suitable initiators include, but are not limited to, detergent compositions; surfactants: e.g., non-ionic surfactants such as polysorbate 20 (e.g., Tween 20™), polysorbate 80 (e.g., Tween 80™) and poloxamers, cationic surfactants such as benzalkonium chloride or its pure components and tetrabutylammonium bromide, anionic surfactants such as sodium tetradecyl sulfate, and amphoteric or zwitterionic surfactants such as dodecyldimethyl(3-sulfopropyl)ammonium hydroxide, inner salt; amines, imines and amides, such as imidazole, tryptamine, urea, arginine and povidine; phosphines, phosphites and phosphonium salts, such as triphenylphosphine and triethyl phosphite; alcohols such as ethylene glycol, methyl gallate, ascorbic acid, tannins and tannic acid; inorganic bases and salts, such as sodium bisulfite, magnesium hydroxide, calcium sulfate and sodium silicate; sulfur compounds such as thiourea and polysulfides; polymeric cyclic ethers such as monensin, nonactin, crown ethers, calixarenes and polymeric epoxides; cyclic and acyclic carbonates, such as diethyl carbonate; phase transfer catalysts such as Aliquat 336; organometallics such as cobalt naphthenate and manganese acetylacetonate; and radical initiators and radicals, such as di-t-butyl peroxide and azobisisobutyronitrile. The polymerizable and/or cross-linkable material may also contain an initiator which is inactive until activated by a catalyst or accelerator (included within the scope of the term "initiator" as used herein) in the applicator tip. Initiators activated by stimulation such as heat and/or light (e.g., ultraviolet or visible light) are also suitable if the tip and/or applicator is appropriately subjected to such stimulation.

The initiator may be applied to the surface of the applicator tip or may be impregnated or incorporated into the matrix or internal portions of the applicator tip. For example, the initiator may be applied to the applicator tip by spraying, dipping, or brushing the applicator tip with a liquid medium containing the initiator. The liquid medium may include non-aqueous solvents, such as ether, acetone, ethanol, pentane or mixtures thereof; or may include aqueous solutions. Preferably, the liquid medium is a low boiling point solvent.

Suitable applicators for application of the adhesive of the present invention include those described in copending application Ser. No. 08/488,411, the subject matter of which is incorporated herein by reference.

The invention will further be illustrated in the following, non-limiting examples, it being understood that these examples are intended to be illustrative only and that the invention is not intended to be limited to the materials, conditions, process parameters and the like recited therein.

EXAMPLES

Example I and Comparative Example I

FIG. 1 indicates that a glass applicator treated with ammonium sulfate protects a 2-octylcyanoacrylate adhesive from premature polymerization, as shown by the constant viscosity of the adhesive. In contrast, an adhesive placed into an untreated glass applicator polymerizes prematurely, as shown by changes in the viscosity of the adhesive. In Example I and Comparative Example I, similar glass applicators are used containing the same adhesive; the only difference is the treatment being applied in the case of Example I.

Example II and Comparative Example II

FIG. 2 indicates that a glass applicator treated with silicon dioxide protects a 2-octylcyanoacrylate adhesive from premature polymerization, as shown a small change in viscosity of the adhesive. In contrast, an adhesive placed into an untreated glass applicator polymerizes prematurely at a much higher rate. In Example II and Comparative Example II, similar glass applicators are used containing the same adhesive; the only difference is the treatment being applied in the case of Example II.

Example III and Comparative Example III

FIG. 3 indicates that a glass applicator treated with sulfur dioxide protects a 2-octylcyanoacrylate adhesive from premature polymerization, as shown by a small change in viscosity of the adhesive. In contrast, an adhesive placed into an untreated glass applicator polymerizes prematurely at a much higher rate. In Example III and Comparative Example III, similar glass applicators are used containing the same adhesive; the only difference is the treatment being applied in the case of Example III.

Example IV

About 0.5 mL (e.g., 10 drops) of an aqueous 9% ammonium sulfate solution is placed inside a glass container. The glass container is then heated to 538° C. at a rate of 25° C./min. Once at 538° C., the glass container is slowly cooled to room temperature at a rate of about 25° C./min.

The resulting alkalide-sulfate material formed in the glass container is subsequently removed by rinsing the glass container with distilled water. The glass surface thus has a much low pH value than an untreated glass container.

Example V

A glass container is placed inside a chamber that is heat and rust resistant. Sulfur dioxide is introduced into the chamber for about 5 minutes to yield a concentration of about 10% acidic gas in air. The chamber is then heated to 220° C. for about 4 hours. The chamber is then cooled to room temperature and the resulting alkalide-sulfate material is removed from the glass container with distilled water. The glass surface thus has a much low pH value than an untreated glass container.

While the invention has been described with reference to preferred embodiments, the invention is not limited to the specific examples given, and other embodiments and modifications can be made by those skilled in the art without departing from the spirit and scope of the invention and claims.

What is claimed is:

1. A method of making a glass applicator containing a composition comprising a 1,1-disubstituted ethylene monomer, comprising:

exposing a glass applicator having alkalide material within, or on a surface of, the glass to at least one agent selected from the group consisting of ammonium sulfate, an acidic gas, a plasma, and a silanizing agent, to form an exposed applicator, dispensing a composition comprising a 1,1-disubstituted ethylene monomer into said exposed applicator, and optionally sealing said applicator containing said composition.

2. The method according to claim 1, further comprising:

heating said exposed applicator to a selected temperature;

cooling said heated exposed applicator; and washing away said alkalide materials from said applicator, wherein said agent is ammonium sulfate or an acidic gas, and wherein said heating, cooling, and washing are performed before said dispensing.

3. The method according to claim 2, wherein said temperature is at about an annealing temperature of said glass.

4. The method according to claim 2, wherein said temperature is between about 450–800° C.

5. The method according to claim 2, wherein said heating is at a rate of about 25° C./min.

6. The method according to claim 2, wherein an aqueous extract from said washing away has a pH of about 5.

7. The method according to claim 1, further comprising decreasing said alkalide material on said surface of said glass applicator from about 1.1 wt. % to about 0 wt. %.

8. The method according to claim 2, wherein said agent is said acidic gas and is selected from the group consisting of sulfur dioxide, carbon dioxide, nitrous oxide, nitrogen dioxide and boron trifluoride.

9. The method according to claim 2, wherein said agent is said acidic gas and said temperature is from about 150–500° C.

10. The method according to claim 2, wherein said agent is said acidic gas, and has a concentration of about 10% in air.

11. The method of claim 1, wherein said 1,1-disubstituted ethylene monomer is an adhesive monomer.

12. The method according to claim 11, wherein said adhesive monomer is a monomeric form of an alpha-cyanoacrylate.

13. A method of treating a glass applicator having alkalide material within, or on a surface of, the glass, comprising:

placing said glass applicator into a chamber containing plasma;

introducing silicon dioxide into said chamber; and covering a surface of said glass applicator with a film of silicon dioxide, wherein said silicon dioxide coats said surface of said glass applicator.

14. The treatment method according to claim 13, further comprising placing an adhesive in the treated applicator.

15. A method of treating a glass applicator having alkalide material within or on a surface of, the glass with a silanizing agent, comprising:

dissolving a radical inhibitor in a solvent containing said silanizing agent to create a solution;

rinsing said glass applicator with said solution, thereby coating said glass applicator; and curing said coated glass applicator to form a cured silanized glass applicator.

16. The treatment method according to claim 15, wherein said silanizing agent is selected from the group consisting of tetramethoxysilane, tetraethoxysilane and tetraisobutoxysilane.

17. The treatment method according to claim 15, wherein said curing is at a temperature of at least 100° C. above a boiling point of said solvent.

18. The treatment method according to claim 15, further comprising adding an adhesive composition to said cured silanized glass applicator.

19. The treatment method according to claim 18, further comprising irradiating said adhesive composition.

20. The treatment method according to claim 18, further comprising sterilizing said adhesive.

21. The treatment method according to claim 20, wherein said sterilizing is selected from the group consisting of electron beam irradiation, microwave irradiation, gamma irradiation, ultraviolet irradiation, infrared irradiation, asceptic filtration and dry heat.

22. The method according to claim 1, wherein said glass applicator comprises an applicator tip comprising an initiator.

23. The method of claim 13, further comprising placing a composition comprising a 1,1-disubstituted ethylene monomer into the treated applicator.

24. The method of claim 23, wherein said 1,1-disubstituted ethylene monomer is an adhesive monomer.

25. The method of claim 24, wherein said adhesive monomer is an α-cyanoacrylate monomer.

26. The method of claim 25, wherein said α-cyanoacrylate monomer is selected from the group consisting of methyl alpha-cyanoacrylate, butyl alpha-cyanoacrylate, 2-octyl cyanoacrylate, 1-methoxy-2-propyl cyanoacrylate, 2-butoxyethyl cyanoacrylate, 2-isopropoxyethyl cyanoacrylate, and 3-methoxybutyl cyanoacrylate.

27. The method of claim 26, wherein said alpha-cyanoacrylate monomer is butyl cyanoacrylate.

28. The method of claim 26, wherein said α-cyanoacrylate monomer is 2-octyl cyanoacrylate.

29. The method of claim 15, further comprising placing a composition comprising a 1,1-disubstituted ethylene monomer into the cured silanized glass applicator.

30. The method of claim 29, wherein said 1,1-disubstituted ethylene monomer is an adhesive monomer.

31. The method of claim 30, wherein said adhesive monomer is an α-cyanoacrylate monomer.

32. The method of claim 31, wherein said α-cyanoacrylate monomer is selected from the group consisting of methyl alpha-cyanoacrylate, butyl alpha-cyanoacrylate, 2-octyl cyanoacrylate, 1-methoxy-2-propyl cyanoacrylate, 2-butoxyethyl cyanoacrylate, 2-isopropoxyethyl cyanoacrylate, and 3-methoxybutyl cyanoacrylate.

33. The method of claim 32, wherein said alpha-cyanoacrylate monomer is butyl cyanoacrylate.

34. The method of claim 32, wherein said alpha-cyanoacrylate monomer is 2-octyl cyanoacrylate.

35. The method of claim 12, wherein said α-cyanoacrylate monomer is selected from the group consisting of methyl alpha-cyanoacrylate, butyl alpha-cyanoacrylate, 2-octyl cyanoacrylate, 1-methoxy-2-propyl cyanoacrylate, 2-butoxyethyl cyanoacrylate, 2-isopropoxyethyl cyanoacrylate, and 3-methoxybutyl cyanoacrylate.

36. The method of claim 35, wherein said alpha-cyanoacrylate monomer is butyl cyanoacrylate.

37. The method of claim 35, wherein said α-cyanoacrylate monomer is 2-octyl cyanoacrylate.

* * * * *